Figure 1:
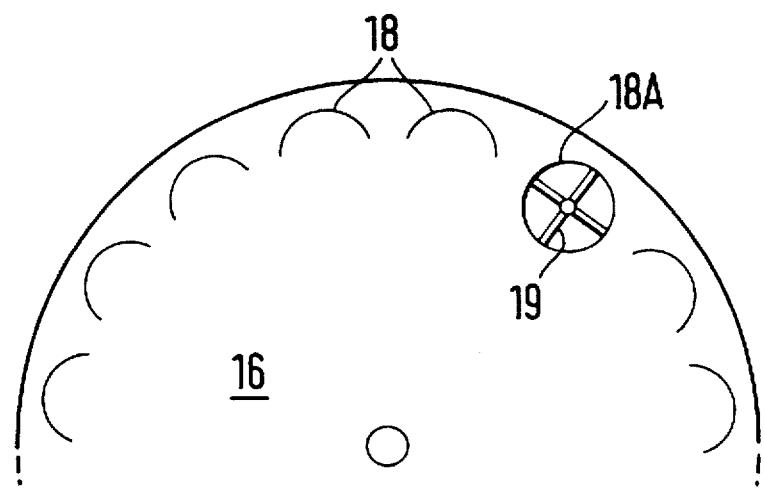

United States Patent [19]

Summerland

[11] Patent Number: 5,739,604
[45] Date of Patent: Apr. 14, 1998

[54] LOW-TORQUE, INTERCHANGEABLE-ROTOR ELECTRIC MOTOR

[75] Inventor: David Thomas Summerland, Leicester, United Kingdom

[73] Assignee: Mad Lighting Limited, Leicester, United Kingdom

[21] Appl. No.: 798,121

[22] Filed: Feb. 12, 1997

[30] Foreign Application Priority Data

| Feb. 20, 1996 | [GB] | United Kingdom | 9603496 |
| Jul. 23, 1996 | [GB] | United Kingdom | 9615473 |

[51] Int. Cl.[6] .............................. H02K 11/00; H02K 7/06
[52] U.S. Cl. ...................... 310/73; 310/80; 362/282; 362/284
[58] Field of Search .......................... 362/284, 282; 310/73, 49 R, 168, 80

[56] References Cited

U.S. PATENT DOCUMENTS

| 4,891,738 | 1/1990 | Richardson et al. | 362/282 |
| 4,945,459 | 7/1990 | Ferren et al. | 362/284 |
| 5,015,903 | 5/1991 | Hancock et al. | 310/168 |
| 5,113,332 | 5/1992 | Richardson | 362/882 |
| 5,198,939 | 3/1993 | Hewett | 359/889 |
| 5,402,326 | 3/1995 | Belliveau | 362/284 |
| 5,517,388 | 5/1996 | Hutschisson | 362/35 |
| 5,537,303 | 7/1996 | Stacy | 362/284 |

*Primary Examiner*—Clayton E. LaBalle
*Assistant Examiner*—Michael J. Wallace, Jr.
*Attorney, Agent, or Firm*—Young & Thompson

[57] ABSTRACT

The stator of an electric motor is provided by coils 22 disposed in an interrupted-annular array about a central space such that a path A through the array is provided whereby a selected one of a plurality of rotors 21 can be moved in the plane of and through the array into and out of said central space. In the preferred embodiment each rotor 21 is a gobo freely rotatable on a wheel which can be indexed to bring it into a light path, when it will be positioned to be rotated when the coils 22 are energised. The non-annular disposition of the coils 22 results in a motor of low torque but it is is adequate to rotate a gobo disc, which is simply a perforated sheet of metal. As applied to a disco lighting unit the motor of the invention provides a much cheaper and simpler drive arrangement for gobo discs.

8 Claims, 2 Drawing Sheets

LOW-TORQUE, INTERCHANGEABLE-ROTOR ELECTRIC MOTOR

This invention relates to a low-torque, interchangeable-rotor electric motor particularly although not exclusively suitable for rotating gobo discs in a lighting effect unit.

In places of public entertainment, particularly discotheques, light beams are used to create atmosphere and promote a pleasurable and exciting environment, for example for dancing. Using mirrors, colour filters and movement diverse effects are created, for example with rotating beams of coloured light.

Patterns can be created using so-called gobo discs, which are in effect stencils interposed in the light beams. A gobo disc masks the associated light beam except where a pattern is cut out of the disc, such as a star-shaped aperture in the disc. Where several such patterns are provided on the same gobo disc a pleasing effect is created by rotating the disc.

Usually several different gobo discs together with other effects such as colour filters or shutters are distributed in respective apertures circumferentially of a carrier wheel. This is rotatable to index the selected one of the gobo discs or the like into the path of the associated light beam. At present gobo discs to be rotated are located in respective carrier rings which have toothed peripheries engaging a sun gear coaxial with the carrier wheel, so that rotation of the sun gear relative to the carrier wheel rotates each gobo disc in its carrier ring. A carrier ring for a gobo disc has been thought necessary because of the light construction of the latter, usually from thin sheet metal. It would not be practicable to form the gobo disc itself with gear teeth by which it might be driven.

The provision of the toothed carrier rings for the gobo discs, the sun gear and its drive and bearings represent a high manufacturing cost which has a considerable impact on the price of a lighting effect unit as a whole. Moreover the gears are required to work in a high temperature environment because of the proximity of a high-power light source in an enclosed housing and this leads at best to a short working life and at worst to break down and failure for example because of lubrication problems.

An object of the present invention is to offer remedies to the problems currently associated with the rotation of gobo discs and to reduce manufacturing costs while enhancing reliability.

According to the invention this object can be achieved by using a gobo disc to be rotated as the rotor of an electric motor, the stator being provided by coils disposed on a fixed mounting about the freely rotatable gobo disc.

Traditionally the element or elements providing the stator of an electric motor are in an annular array which is as complete as possible. There has been no motivation deliberately to provide gaps in the array because these would reduce the torque output of the motor.

However in a lighting effect unit as aforedescribed it is desired to move gobo discs through and in the plane of any array of stator elements used to rotate them.

The present invention proceeds from the realisation that because of the very light weight of a gobo disc it may be spun effectively by an electric motor of low torque. Therefore it is acceptable to omit stator elements from the annular array thereof which would otherwise obstruct indexing movement of a gobo disc on the carrier ring into and out of a position in which the gobo disc will serve as the rotor of the motor.

A further and subsidiary feature of the present invention is to render a gobo disc suitable as the rotor of an electric motor by giving it a toothed periphery. This is not the only way in which the periphery of a gobo disc could be given the necessary characteristic of being magnetically discontinuous. For example a non-ferrous, e.g. plastics, gobo disc might be provided peripherally with mutually spaced ferrous inserts. However the toothed periphery is the preferred option because it is easier and cheaper to make and has the added benefit of further reducing the weight of the gobo disc.

In accordance with the present invention there is provided a low-torque, interchangeable rotor electric motor in which the stator is provided by coils disposed in an interrupted-annular array about a central space such that a path through the array is provided whereby a selected one of a plurality of rotors can be moved in the plane of and through the array into and out of said central space.

The said path preferably traverses the array such that a rotor can be moved in the same direction both into and out of said central space.

The coils may be distributed about an aperture in a mounting such that said central space is in alignment with the said aperture and a carrier for the rotors may be provided which is rotatable relative to the mounting, the carrier having at substantially equal distances from its axis of rotation a plurality of rotor elements distributed circumferentially of the carrier, each said rotor element being rotatable relative to the carrier.

Each rotor element may be rotatable on a respective stem which extends from a side of the carrier nearer to the mounting, each said stem being mounted centrally of an aperture in the carrier aligned with the respective rotor.

When the motor of the two immediately preceding paragraphs is used in a lighting effect unit which also comprises a light source and at least one lens spaced from the light source along a light path, preferably the carrier and the mounting are disposed substantially parallel with one another between said lens and the light source such that said central space is in said light path and indexing rotation of the carrier may bring any one of the rotors thereon into and out of said light path.

The end of each stem remote from its respective rotor may be mounted on a cross-member arrangement spanning the aperture in the carrier associated with said stem and the arrangement may be such that light from the light source is more focused on said lens than on said cross-member arrangement, when disposed in the light path, such that said lens and any additional lenses downstream thereof in the light path will not provide a sharply defined image of the cross-member arrangement.

Each rotor may be a gobo disc which has a magnetically discontinuous periphery such that it will be rotated by the coils when located in said central space and when the coils are sequentially energised.

Preferably each gobo disc has a toothed periphery whereby it is magnetically discontinuous.

By a "magnetically discontinuous periphery" is meant that magnetic attractance is not uniform circumferentially of the gobo disc. If the disc is of magnetisable metal this can be achieved by giving the disc a toothed periphery. However if it is not the same effect could be achieved, for example, by positioning elements of magnetisable metal in circumferentially spaced locations around the periphery of a circular, non-magnetiseable disc.

Figure 2:
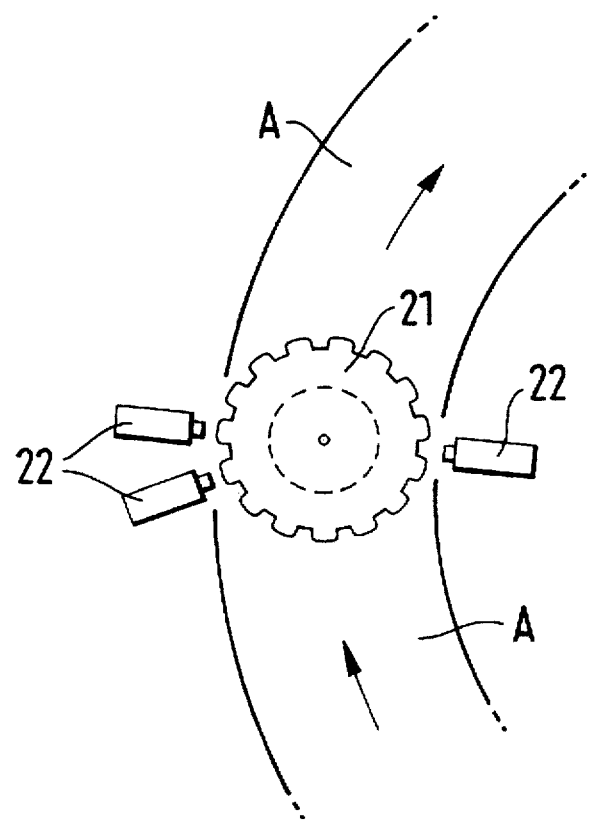
Figure 3:
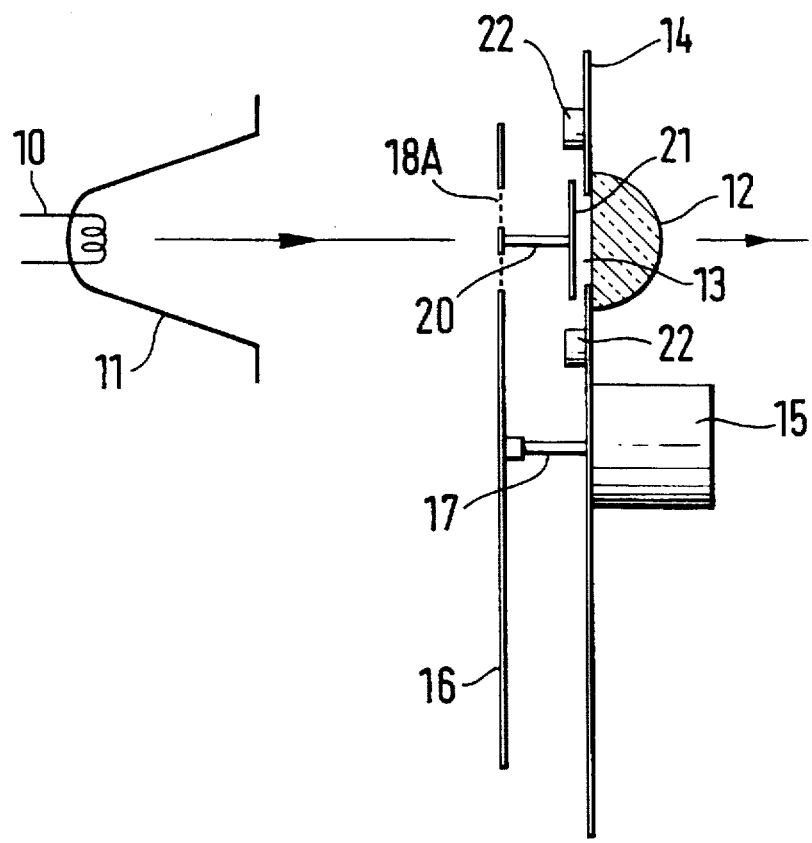

A preferred embodiment of the invention will now be described with reference to the accompanying diagrammatic drawings, in which:

FIG. 1 is a partial view of a carrier wheel formed peripherally with apertures in one of which a mounting for the bearing of a gobo disc is located, FIG. 2 illustrates a motor in accordance with the present invention, and FIG. 3 is a sectional elevation of a lighting effect assembly incorporating the motor of the invention.

Referring first to FIG. 3, a lighting effect unit comprises a light source 10 the light from which is focused by a reflector 11 generally at a lens 12. The lens 12 spans an aperture 13 in a fixed plate 14 carrying a conventional electric motor 15. A main gobo wheel 16 is rotatable by motor 15 via a shaft 17. As is known per se and as illustrated in FIG. 1 the gobo wheel 16 has circumferentially distributed apertures 18 which, by indexing movement effected by the motor 15, can be brought in sequence into alignment with the aperture 13. If each of the apertures 18 is associated with a different gobo disc different light effects can be provided by suitable indexing rotation of wheel 16. One or more additional wheels (not shown) interposed between light source 10 and lens 12 may carry other effects such as colour filters. A shutter (not shown) may also be provided.

In accordance with the present invention the aperture 18A in wheel 16 is spanned by a cross-strut 19 which serves as a mounting for one end of a bearing pin 20. The other end of pin 20 rotatably carries a gobo disc 21 so that the latter is coaxial with aperture 18A and is spaced by the length of pin 20 from wheel 16 toward fixed plate 14.

Mounted on fixed plate 14 to be distributed around aperture 13 are coils 22. The disposition of the coils 22 is such that an arcuate path A exists between them, this being the path which will be swept by gobo disc 21 when the carrier ring 16 is rotated. The gobo disc 21, which is stamped out of thin sheet metal, has a toothed periphery as seen in FIG. 2. The angular separation of the teeth is related to the angular separation of the coils 22 such that when the coils 22 are sequentially energised they will produce a variable reluctance field which will cause the gobo disc 21 to spin on pin 20.

It is within the competence of the skilled person to vary the number and angular separation of the coils 22 as well as the design of the periphery of the disc 21 to achieve optimum results in terms of the rotation and control of the disc 21. This technology is known per se from electric stepper motors so that more detailed description is considered unnecessary except to say that the arrangement of the invention differs from a conventional stepper motor in that it is not designed to create optimum torque. Its only purpose is to spin the disc 21 which, as previously discussed, will normally be of very light construction. The sacrifice of torque permits the arrangement of coils 22 such that they will not obstruct the movement of gobo disc 21 in path A both into and out of the central space between the coils 22.

It will be apparent that the remaining apertures 18 of wheel 16 may be associated either with similar gobo disc arrangements or by alternative lighting effects. The same coils 22 are, of course, used to spin any selected gobo disc or similar disc.

I claim:

1. A lighting effect system comprising means for generating a beam of light and moans for interposing in said light beam a selected one of a plurality of light modifying elements, said interposing means comprising a wheel rotatable about an axis generally parallel with the light beam, the light modifying elements being mounted on said wheel in a circumferential array and each rotatable about a respective axis relative to the wheel, and an interrupted annular array of stators having a fixed position relative to the generating means such that by rotating the wheel the elements may be brought selectively to an operative position between the stators, said elements each being adapted to serve as the rotor of a stepping motor comprising said stators such that a selected element indexed to the operative position by the wheel may be rotated about its respective axis by energising the stators.

2. A system as claimed in claim 1, and comprising a support structure having an opening, the stators being disposed on the support structure about the opening, the wheel having a circumferential array of apertures and being rotatable relative to the support structure to bring said apertures selectively into alignment along the light beam with said opening of the support structure, each said light modifying element being mounted on the wheel to be rotatable about a respective axis relative to the wheel which axis is aligned with a respective one of the wheel apertures.

3. A system as claimed in claim 2 wherein the light modifying elements are mounted on the wheel so as to lie in the space between the wheel and the support structure, each aperture in the wheel being spanned by a cross-member from which a respective pin extends toward the support structure and each light modifying element being rotatably mounted on a respective one of the pins.

4. A system as claimed in claim 3 wherein the means for generating a beam of light comprises a light source on one side of the support structure and wheel and a lens on the opposite side of the support structure and wheel, the arrangement being such that light from said light source is more focused on said lens than on the cross-member of a wheel aperture aligned with the opening in the support structure.

5. A motor as claimed in claim 1, wherein each rotor is a gobo disc which has a magnetically discontinuous periphery such that it will be rotated by the coils when located in said central space and when the coils are sequentially energised.

6. A motor as claimed in claim 5, wherein each gobo disc has a toothed periphery whereby it is magnetically discontinuous.

7. A lighting effect system comprising a light source and a lens in spaced apart relation, a reflector to focus a beam of light from the source generally at the lens and between the light source and the lens a stationary support structure and a wheel rotatable in a plane generally parallel with the support structure whereby peripheral regions both of the support structure and of the wheel intersect the beam generally at right angles, the support structure having an opening in alignment with the lens and an array of stepping motor stators disposed about the opening so as to provide an arcuate path therethrough, and a plurality of apertures in the wheel circumferentially distributed such that on rotation of the wheel each can be selectively indexed into alignment with the opening, there being associated with each said aperture a light modifying element such as a gobo which is rotatably mounted on support means extending from the wheel toward the support structure, each said light modifying element being adapted to serve as the rotor of a stepping motor comprising said stators and the arrangement being such that the wheel is rotatable to index a selected one of the light modifying elements to a position where it is interposed in the light beam in alignment with the opening and with the associated aperture and may be rotated when the stators are energised.

8. A system as claimed in claim 7, wherein said support means for each said light modifying element comprises a cross-member spanning the associated aperture and a pin extending from the cross-member toward the support structure, said light modifying element being rotatably mounted on the distal end of the pin.

* * * * *